United States Patent

Steiss et al.

(10) Patent No.: US 9,256,548 B2
(45) Date of Patent: Feb. 9, 2016

(54) RULE-BASED VIRTUAL ADDRESS TRANSLATION FOR ACCESSING DATA

(71) Applicants: Donald Edward Steiss, Richardson, TX (US); Marvin Wayne Martinez, Jr., Plano, TX (US); John H. W. Bettink, San Jose, CA (US); John C. Carney, Lexington, MA (US); Mark Warden Hervin, Plano, TX (US)

(72) Inventors: Donald Edward Steiss, Richardson, TX (US); Marvin Wayne Martinez, Jr., Plano, TX (US); John H. W. Bettink, San Jose, CA (US); John C. Carney, Lexington, MA (US); Mark Warden Hervin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 220 days.

(21) Appl. No.: 13/688,520

(22) Filed: Nov. 29, 2012

(65) Prior Publication Data

US 2014/0149712 A1 May 29, 2014

(51) Int. Cl.
*G06F 12/00* (2006.01)
*G06F 12/10* (2006.01)

(52) U.S. Cl.
CPC ................................. *G06F 12/1009* (2013.01)

(58) Field of Classification Search
CPC .... H04L 29/06; H04L 45/00; H04L 29/06027
USPC ......................................................... 711/206
See application file for complete search history.

(56) References Cited

U.S. PATENT DOCUMENTS

| 6,467,019 | B1 * | 10/2002 | Washburn ......... G06F 17/30982 365/168 |
| 6,839,800 | B2 * | 1/2005 | Stark ............................ 711/108 |
| 7,082,511 | B2 * | 7/2006 | Masui ................. G06F 12/1036 711/202 |
| 7,206,922 | B1 | 4/2007 | Steiss |
| 7,441,101 | B1 | 10/2008 | Steiss et al. |
| 7,551,617 | B2 | 6/2009 | Eatherton et al. |
| 7,739,426 | B1 | 6/2010 | Steiss et al. |
| 8,156,309 | B2 | 4/2012 | Steiss |
| 8,245,014 | B2 | 8/2012 | Steiss et al. |
| 9,159,420 | B1 * | 10/2015 | Wohlgemuth ......... G11C 15/00 |
| 2009/0287902 | A1 * | 11/2009 | Fullerton ............ G06F 12/1081 711/206 |
| 2012/0191875 | A1 * | 7/2012 | Kano ........................... 709/245 |
| 2013/0031330 | A1 * | 1/2013 | Jones ................... G06F 13/385 711/206 |

OTHER PUBLICATIONS

Laurence S. Kaplan, "A Flexible Interleaved Memory Design for Generalized Low Conflict Memory Access," Distributed Memory Computing Conference, 1991, Proceedings, The Sixth, Apr. 28-May 1, 1991, IEEE, New York, New York (eight pages).

* cited by examiner

*Primary Examiner* — Brian Peugh
*Assistant Examiner* — Edmund Kwong
(74) *Attorney, Agent, or Firm* — The Law Office of Kirk D. Williams

(57) ABSTRACT

In one embodiment, rule-based virtual address translation is performed for accessing data (e.g., reading and/or writing data) typically stored in different manners and/or locations among one or more memories, such as, but not limited to, in packet switching devices. A virtual address is matched against a set of predetermined rules to identify one or more storing description parameters. These storing description parameters determine in which particular memory unit(s) and/or how the data is stored. Thus, different portions of a data structure (e.g., table) can be stored in different memories and/or using different storage techniques. The virtual address is converted to a lookup address based on the identified storing description parameter(s). One or more read or write operations in one or more particular memory units is performed based on the lookup address said converted from the virtual address.

20 Claims, 6 Drawing Sheets

| 0 | STORING DESCRIPTION PARAMETERS |
| 1 | STORING DESCRIPTION PARAMETERS |
| ⋮ | ⋮ |
| N-1 | STORING DESCRIPTION PARAMETERS |

RULE-BASED VIRTUAL ADDRESS TRANSLATION FOR ACCESSING DATA

TECHNICAL FIELD

The present disclosure relates generally to rule-based virtual address translation for accessing data typically stored, or to be stored, in different manners and/or locations among one or more memories, such as, but not limited to, in packet switching devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity. In trying to achieve these goals, a common approach taken by many communications providers is to use packet switching technology.

Forwarding packets by a packet switching device in a network requires reading information stored in forwarding tables, such as forwarding information retrieved based on a destination address and/or other characteristics of a packet. The latency of retrieving this forwarding information typically affects the forwarding rate of a packet switching device. The size of the tables accessible by the packet switching device affects the number of devices or connections that can be handled by the packet switching device.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1:
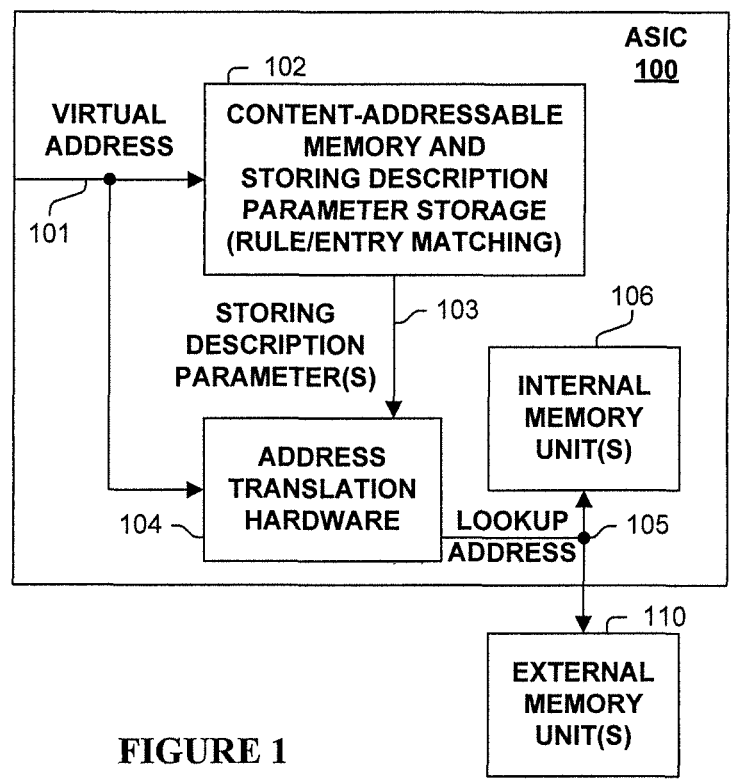
FIG. 1 illustrates an apparatus operating according to one embodiment.

Disclosed are, inter alia, methods, apparatus, computer-storage media, mechanisms, and means associated with rule-based virtual address translation for accessing data (e.g., reading, writing, indivisibly operating on data, performing complex operations) typically stored in different manners and/or locations among one or more memories, such as, but not limited to, in packet switching devices.

One embodiment includes a method, comprising: matching a virtual address against a set of a plurality of predetermined rules in identifying one or more storing description parameters for converting the virtual address to a lookup address; converting the virtual address to the lookup address based on said identified storing description parameters; and performing one or more data access operations in one or more particular memory units based on the lookup address said converted from the virtual address. In one embodiment, the lookup address includes one or more physical addresses in said one or more particular memory units. In one embodiment, one or more data access operations includes, or consists of: one, two, or three or more read, write and/or indivisible/atomic/complex operations.

In one embodiment, a plurality of memory units includes said one or more particular memory units; wherein said identified storing description parameters include an identification of said one or more particular memory units. In one embodiment, the method includes: matching a second virtual address against the set of the plurality of predetermined rules to identify one or more second storing description parameters for converting the second virtual address to a second lookup address, wherein said identified second storing description parameters include an identification of a second one or more particular memory units, different than said one or more particular memory units, of the plurality of the memory units; converting the second virtual address to the second lookup address based on said identified second storing description parameters; and performing one or more data access operations in said second one or more particular memory units based on the second lookup address said converted from the second virtual address. In one embodiment, said matching and converting operations are performed within a device; wherein the device includes said one or more particular memory units; and wherein said one or more second particular memory units are external to the device. In one embodiment, the first and second virtual addresses correspond to different entries in a same tabular data structure.

One embodiment includes: matching a second virtual address against the set of the plurality of predetermined rules to identify one or more second storing description parameters for converting the second virtual address to a second lookup address, wherein said identified second storing description parameters include an identification of said one or more particular memory units, wherein said identified second storing description parameters are different than said identified first storing description parameters; converting the second virtual address to the second lookup address based on said identified second storing description parameters; and performing one or more data access operations in said one or more particular memory units based on the second lookup address said converted from the second virtual address.

In one embodiment, the set of the plurality of the predetermined rules contains at least two rules that have overlapping space that match the virtual address; and wherein said matching the virtual address against the set of the plurality of predetermined rules includes deterministically selecting a particular rule among said at least two rules that match the virtual address as the single matching rule. In one embodiment, said one or more storing description parameters associated with a first rule of said at least two rules and said one or more storing description parameters associated with a second rule of said at least two rules identify to store in different memory units of said particular one or more memory units. In one embodiment, said one or more storing description parameters associated with a first rule of said at least two rules identify striping of data (e.g., distributing sequential addresses within some fixed block size across a set of memory devices, interleaving of data), and said one or more storing description parameters associated with a second rule of said at least two rules identify no striping of data.

In one embodiment said one or more storing description parameters includes at least one storing description parameter from a set of storing description parameters consisting of: power-of-two translation page size, power-of-two virtual page offset, non-power-of-two-aligned physical offset, translation stride, and a packed table indicator. One embodiment includes determining the virtual address from a table offset and base address prior to said matching operation. In one embodiment, said matching the virtual address against the set of the plurality of predetermined rules includes matching the virtual address in parallel against at least a plurality of the plurality of predetermined rules. In one embodiment, said one or more data access operations consists of one or more read operations.

One embodiment includes an apparatus, comprising: content-addressable memory and storing description parameter storage hardware configured to match an input virtual address in parallel against a plurality of stored matching values resulting in the identification of one or more storing description parameters for converting the virtual address to a lookup address; address translation hardware configured to convert the virtual address to the lookup address based on said identified storing description parameters; and one or more memories configured to perform one or more data access operations based on an address identified by the lookup address.

In one embodiment, said one or more memories includes one or more external memories and one or more internal memories; wherein the apparatus includes an application-specific integrated circuit (ASIC), and said one or more external memories external to the ASIC; wherein the ASIC includes said content-addressable memory and storing description parameter storage hardware, said address translation hardware, and said one or more internal memories; wherein the apparatus is configured to determine the lookup address for accessing data in said one or more internal memories for the input virtual address having a first value; and wherein the apparatus is configured to determine the lookup address for accessing data in said one or more external memories for the input virtual address having a second value.

In one embodiment, said content-addressable memory and storing description parameter storage hardware is configured to receive a rule set selection value for selecting among a plurality of sets of stored matching values, wherein a single set of the plurality of sets of stored matching values corresponds to the plurality of stored matching values.

In one embodiment, said one or more memories includes one or more external memories and one or more internal memories. In one embodiment, the apparatus includes: an application-specific integrated circuit (ASIC), and said one or more external memories external to the ASIC; wherein the ASIC includes said content-addressable memory and storing description parameter storage hardware, said address translation hardware, and said one or more internal memories; wherein the apparatus is configured to determine the lookup address within said one or more internal memories for the input virtual address having a particular value when the rule set selection value is a first value; and wherein the apparatus is configured to determine the lookup address within said one or more external memories for the input virtual address having the particular value when the rule set selection value is a second value.

In one embodiment, the content-addressable memory and storing description parameter storage hardware: includes content-addressable memory lookup hardware, and storing description parameter memory; and wherein said content-addressable memory lookup hardware is configured to perform a lookup operation on the plurality of stored matching values to identify an address within said storing description parameter memory; and wherein said storing description parameter memory is configured to retrieve said one or more storing description parameters stored at a location corresponding to the address within said storing description parameter memory.

In one embodiment, each of the content-addressable memory lookup hardware and storing description parameter memory includes a second interface for respectively being updated.

One embodiment includes an apparatus, comprising: external memory; and an application-specific integrated circuit, including: internal memory; content-addressable memory and storing description parameter storage hardware configured to match an input virtual address in parallel against a selected set of a plurality of sets of stored matching values stored in said content-addressable memory and storing description parameter storage hardware resulting in the identification of one or more storing description parameters for converting the virtual address to a lookup address; and address translation hardware configured to convert, based on said identified storing description parameters, the virtual address to the lookup address for performing a read operation in either the internal or external memory as defined by said identified storing description parameters at a location identified by the lookup address.

2. Description

Disclosed are, inter alia, methods, apparatus, computer-storage media, mechanisms, and means associated with rule-based virtual address translation for accessing data (e.g., reading, writing, and/or indivisibly operating on data) typically stored in different manners and/or locations among one or more memories, such as, but not limited to, in packet switching devices. For example, certain portions of a forwarding table in a packet switching device may be accessed more frequently than other portions. One embodiment, at runtime providing an optimization, determines and/or modifies how and where certain portions (e.g., groups of one or more virtual addresses) of the forwarding table are stored among internal and external memory devices. One embodiment allows the code requesting the memory access to remain exactly the same regardless of where and how such requested data is stored.

Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. The term "particular machine," when recited in a method claim for performing steps, refers to a particular machine within the 35 USC §101 machine statutory class.

As used herein, a "memory unit" refers to one or more memories, and possibly also including control hardware and/or other logic for performing read and/or write operations in these one or more memories. In one embodiment, a lookup address is parsed to identify or memories and/or physical address(es). In one embodiment, a read and/or write operation may include accessing multiple memories and combining results such as when reading data striped across multiple memories (e.g., distributing sequential addresses within some fixed block size across a set of memory devices, sometimes referred to as interleaving of data).

Further, as used herein, a "data access operation" refers to a read operation, a write operation, and/or an indivisible/atomic/complex operation (e.g., read-modify-write operation).

Furthermore, as used herein, "storing description parameters" refers to characteristics (e.g., how and/or where) for accessing data in one or more memories. In one embodiment, storing description parameters define which (internal and/or external) memory or memories to be accessed. In one embodiment, storing description parameters identify which copy of a table or other data structure to be accessed. In one embodiment, storing description parameters identify whether or not data is stored in a single memory or striped among multiple memories, and possibly which single memory or multiple memories. In one embodiment, storing description parameters include a power-of-two translation page size, power-of-two virtual page offset, non-power-of-two-aligned physical offset, translation stride, and/or a packed table indicator.

Expressly turning to the figures, FIG. 1 illustrates an apparatus used in one embodiment. As shown, the apparatus includes an application-specific integrated circuit (ASIC) 100 and one or more external memory units 110. ASIC 100 includes content-addressable memory and storing description parameter storage 102, address translation hardware 104, and one or more internal memory unit(s) 106.

Data to be accessed is typically stored in internal memory unit(s) 106 and/or external memory unit(s) 110. A same data structure (e.g., a table, list) can be partitioned (e.g., in groups of one or more virtual addresses) among internal and external memory units 106 and 110 as desired, and as determined at run-time in one embodiment. Also, the manner in which portions are stored in internal and external memory units 106 and 110 can, but are not required to, vary per partition.

ASIC 100 receives virtual address 101 for which to perform a memory access. Content-addressable memory and storing description parameter storage 102 compares virtual address 101 to its stored rules and identifies one or more storing description parameters 103. Address translation hardware 104, based on storing description parameter(s) 103, converts the virtual address to lookup address 105 for performing the actual access to the data stored in internal memory unit(s) 106 and/or external memory unit(s) 110.

Figures 2A, 2B:
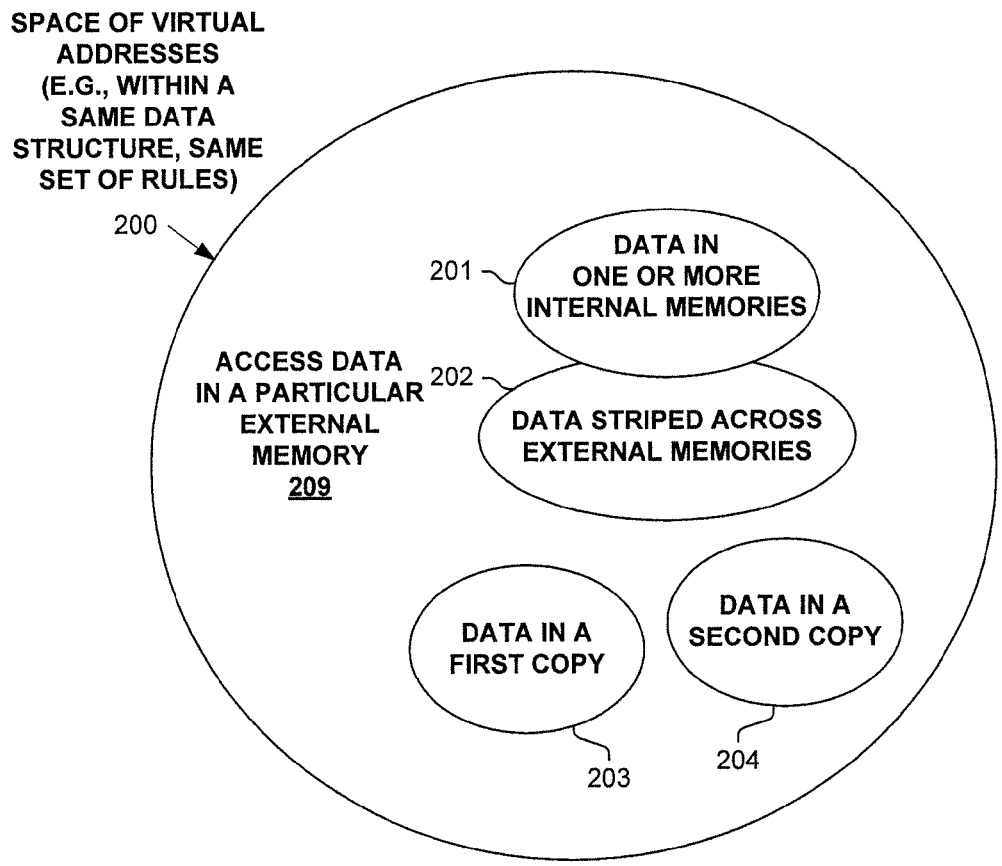
FIG. 2A illustrates virtual address space partitioning according to one embodiment.
FIG. 2B illustrates a storing description parameters data structure according to one embodiment.

The rules stored in content-addressable memory and storing description parameter storage 102 allow a partition to be defined for a single virtual address or multiple virtual addresses as illustrated by the Venn diagram of FIG. 2A illustrating one embodiment's partitioning. Shown is space 200 of virtual addresses, typically for a same data structure (e.g., table, list) defined by a set of rules. One embodiment supports matching against a selected set of rules of multiple programmed sets of rules.

The default matching in space 200 is to access data from a particular external memory (209). Also shown are two overlapping spaces 201 and 202, with space 201 having high-priority as shown (thus if a virtual address matches rules corresponding to both spaces 201 and 202, deterministically the result will be that space 201 is matched).

In one embodiment illustrated in FIG. 2A, a virtual address that matches space 201 will result in the accessing of data in one or more internal memories. A virtual address that matches space 202 (that does not also match space 201) will result in the accessing of data stripped across external memories. A virtual address that matches space 203 will result in the accessing of data of a first copy of the table (stored in some memory or memories). A virtual address that matches space 204 will result in the accessing of data of a second copy of the table (stored in some memory or memories). And, as previously mentioned, a virtual address that matches space 209 will result in the accessing of data in a particular external memory.

Once a particular rule is deterministically determined by the matching operation, a corresponding set of one or more storing description parameters are identified. In one embodiment, the content-addressable memory also stores the storing description parameters. In one embodiment, each rule corresponds to a different number zero to n−1, where there are, or possibly up to, n rules that will be matched against. A table 220 of FIG. 2B is used in one embodiment to store corresponding storing description parameters. Thus, if rule one is matched, corresponding entry one in table 220 contains the corresponding storing description parameters.

In this manner, a virtual address of data to be accessed can be matched against a set of rules, with each rule programmed to match one or more virtual addresses in the space of possible virtual addresses. Each matching rule is associated with one or more storing description parameters, and multiple matching rules can be associated with the same one or more storing description parameters. These storing description parameters determine in which internal/external memory unit(s) and/or how the data is stored. In one embodiment, these storing description parameters identify which internal/external memory unit(s), as how they are stored in particular memory unit(s) is predetermined. These corresponding storing description parameters can be updated during the operation of an apparatus to change where and/or how corresponding data is to be accessed providing quite a bit of flexibility to optimize data accessing according to the needs of a particular application as well as the data patterns associated therewith (e.g., the corresponding use by a particular customer).

This flexibility provides several useful capabilities, including, but not limited to partitioning, striped partitions, blocked partitions, and/or partition replication. Frequently used partitions of a data structure can be mapped to scarce, but higher performance internal memory, while other partitions of the data structure can be stored in slower, less expensive external memory. Frequently used partitions of a data structure can be spread over multiple memory units to permit more parallel accesses from processors. Less frequently used partitions can be stored in a range of row addresses in a single memory unit to free up other memory units for higher traffic partitions. Multiple/different copies of frequently used partitions can be provided to different multicore processors by having unique mappings from the same virtual address to different physical addresses in same or different memory unit(s).

Figure 3:
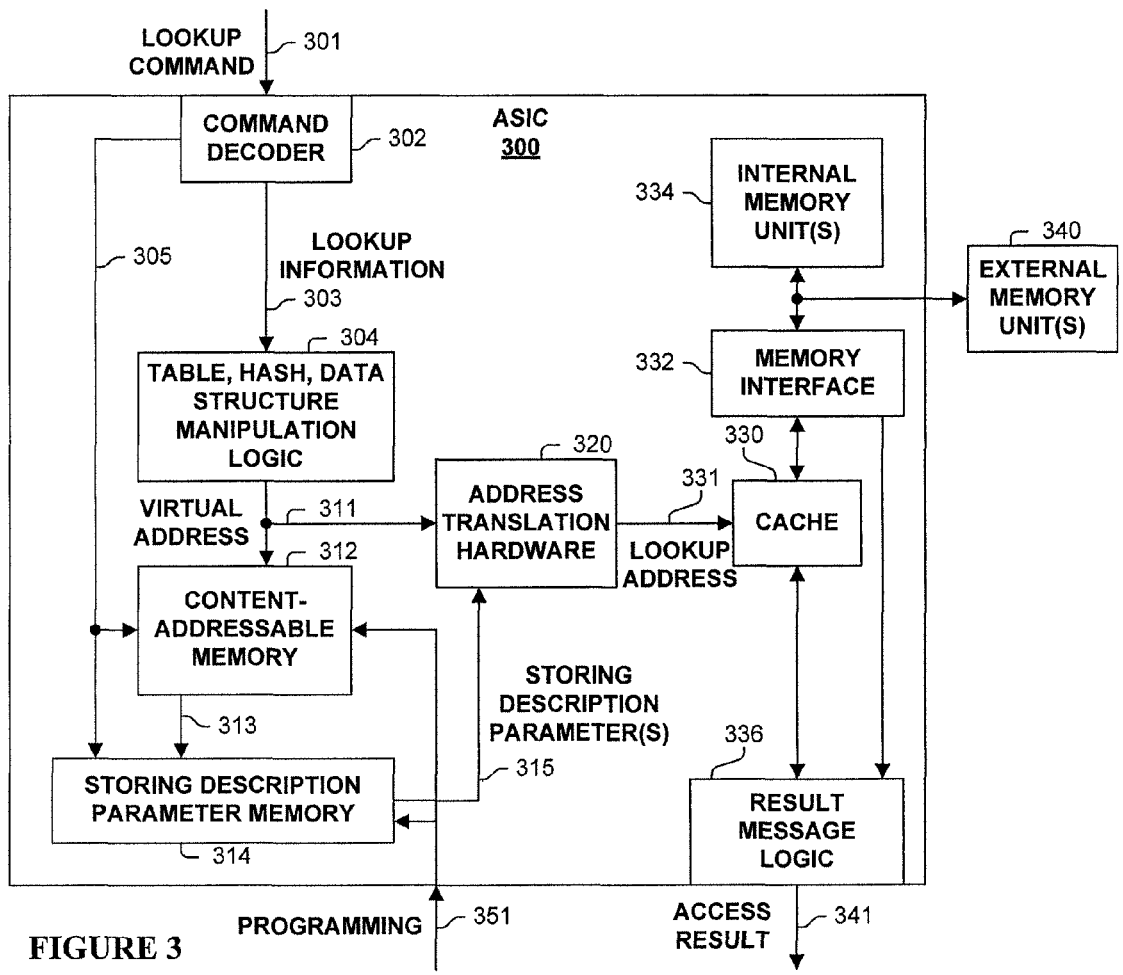
FIG. 3 illustrates an apparatus operating according to one embodiment.

FIG. 3 illustrates an apparatus, including ASIC 300 and external memory unit(s) 340, used in one embodiment. ASIC 300 receives a lookup command 301, which is decoded by command decoder 302 to generate lookup information 303 and to select (305) among a particular set of multiple sets of rules/storing description parameters.

Table, hash, data structure manipulation logic 304 modifies lookup information 303 according to the particular type of data to be accessed to generate virtual address 311. For example, one embodiment performs lookup operations in forwarding tables for forwarding of packets, with lookup information 303 containing a base address, and an offset or some other indication of which entry in the table to be read. For example, one embodiment performs lookup operations in a hash table or list, with lookup information 303 containing corresponding identifying information. Table, hash, data structure manipulation logic 304 performs the corresponding translation to identify the virtual address of the desired data to be accessed. In this manner, the requesting process does not need to be aware of how and/or where the data is actually stored. Examples of operations performed by table, hash, data structure manipulation logic 304 of one embodiment include, but are not limited to, bit shifting, remainder calculation, addition (e.g., base address plus supplied or calculated offset), bit masking (e.g., low order bits), hash function. In other words, table, hash, data structure manipulation logic 304 performs the translation of a received address of a data structure to virtual address 311.

Virtual address 311 is provided to content-addressable memory 312, which uses the virtual address as a lookup value to match in parallel against the selected (305) set of rules (e.g., programmed binary or ternary content-addressable memory entries) to deterministically identify a single matching rule/entry identified by signal 313 (or a no match condition which is accordingly handled by error processing or by a default matching value). The storing description parameter(s) 315 corresponding to matching rule identification 313 are retrieved from storing description parameter memory 314.

Address translation hardware 320 converts virtual address 311, based on storing description parameter(s) 315, to lookup address 331 which is used to access the desired data. In one embodiment, lookup address 331 identifies one or more internal and/or external memories and a physical address therein. In one embodiment, the conversion performed by address translation hardware 320 may include, but is not limited to, bit masking, adjustment for stride, adjustment for packing of data, adjusting for page size, adjusting for start of page offset, and identification of the memory unit to be accessed.

Cache 330 performs normal caching of data and is coupled to memory interface 332 for accessing internal memory unit(s) 334 and external memory unit(s) 340. The result of the data access (e.g., read data, write confirmation) is provided to result message logic 336 for providing access result 341, such as to the requesting processor.

Additionally, ASIC 300 is configured to retrieve programming information 351 for programming content-addressable memory 312 and storing description parameter memory 314. In one embodiment, a non-active set of content-address memory entries and corresponding entries in storing description parameter memory 314 are programmed while a different active set is used. This allows an immediate switch-over to the newly programmed information via selection 305. In one embodiment, different types of packets can use different sets of storing description parameters that correspond to different sets of tables.

In one embodiment, a single ASIC includes multiple content-addressable memories and storing description parameter memories which can operate in parallel. In one embodiment, a single ASIC includes multiple pipelines of rule-based virtual address translation circuitry for accessing data (e.g., that included in ASIC 300, or a portion thereof) that can operate in parallel. In one embodiment, a single ASIC includes n multiple pipelines of rule-based virtual address translation circuitry for accessing data for m processors, where n is typically less than or equal to m.

Figure 4:
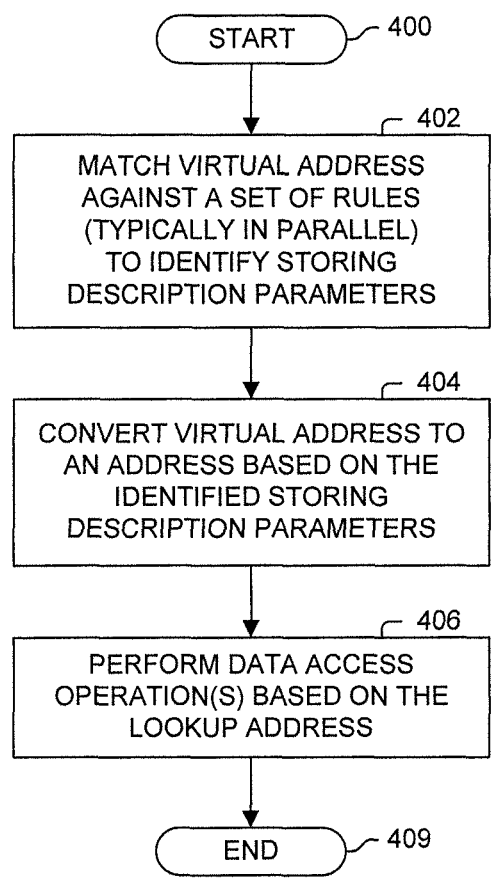
FIG. 4 illustrates a process according to one embodiment.

FIG. 4 illustrates a process performed in one embodiment. Processing begins with process block 400. In process block 402, a virtual address is matched against a set of rules, typically in parallel, to identify corresponding storing description parameter(s). In process block 404, the virtual address is converted to an actual address of the data to be accessed based on the identified storing description parameter(s). In process block 406, one or more data access operations are performed to access the data. Processing of the flow diagram of FIG. 4 is complete as indicated by process block 409.

Figure 5:
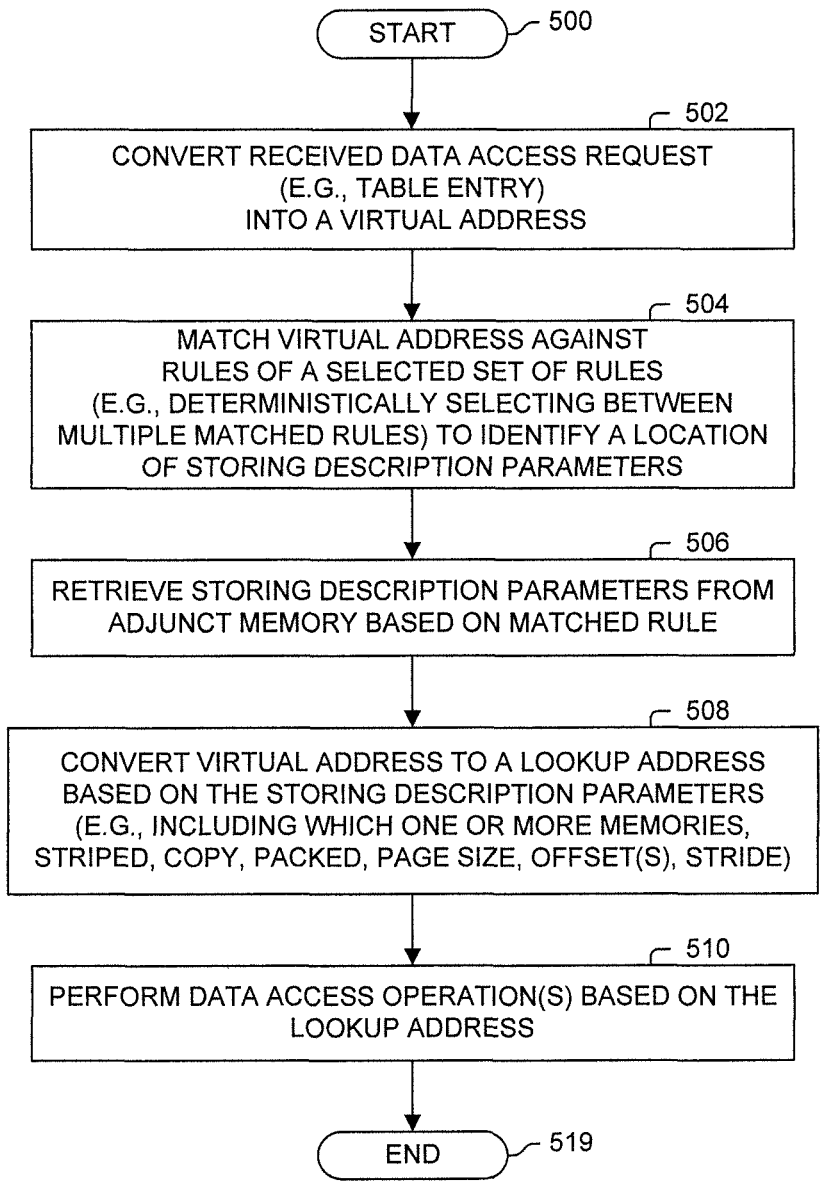
FIG. 5 illustrates a process according to one embodiment.

FIG. 5 illustrates a process performed in one embodiment. Processing begins with process block 500. In process block 502, a data access request is converted to a virtual address. In process block 504, the virtual address is matched against a selected set of multiple sets of rules to identify a location of corresponding storing description parameters in an adjunct memory. In process block 506, the corresponding storing description parameters are retrieved from the adjunct memory. In process block 508, the virtual address is converted to an actual address of the data to be accessed based on the identified storing description parameter(s). In process block 510, one or more data access operations are performed to access the data. Processing of the flow diagram of FIG. 5 is complete as indicated by process block 519.

Figure 6A:
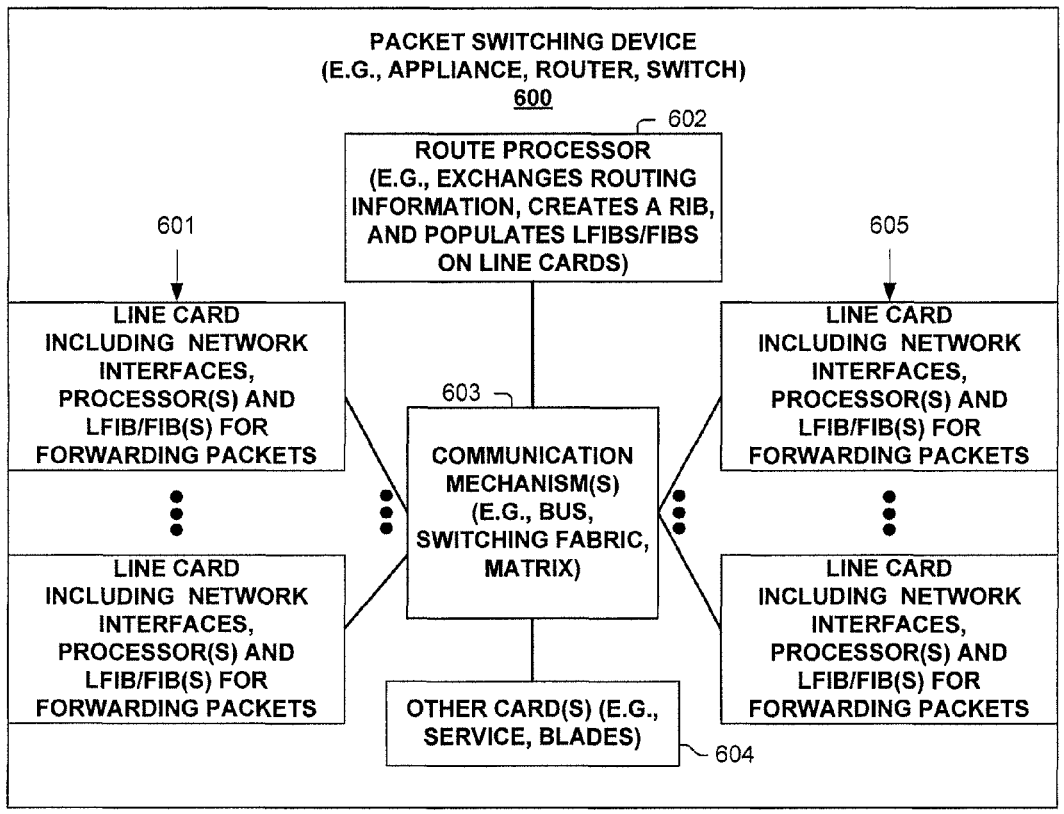
FIG. 6A illustrates a packet switching device according to one embodiment.

One embodiment of a packet switching device 600 using rule-based virtual address translation for accessing data is illustrated in FIG. 6A. As shown, packet switching device 600 includes multiple line cards 601 and 605, each with one or more network interfaces for sending and receiving packets over communications links (e.g., possibly part of a link aggregation group), and with one or more processing elements. Packet switching device 600 also has a control plane with one or more processing elements 606 for managing the control plane and/or control plane processing of packets. Packet switching device 600 also includes other cards 604 (e.g., service cards, blades) which include processing elements that are used in one embodiment to process packets, and some communication mechanism 603 (e.g., bus, switching fabric, matrix) for allowing its different entities 601, 602, 604 and 605 to communicate. Line cards 601 and 605 typically perform the actions of being both an ingress and egress line card, in regards to multiple other particular packets and/or packet streams being received by, or sent from, packet switching device 600. One or more of line cards 601 and 605 are configured to use rule-based virtual address translation for accessing forwarding information stored in a forwarding information base. In one embodiment, route processor 602 manages the programming of the rules and storing description parameters in line cards 601 and 605.

Figure 6B:
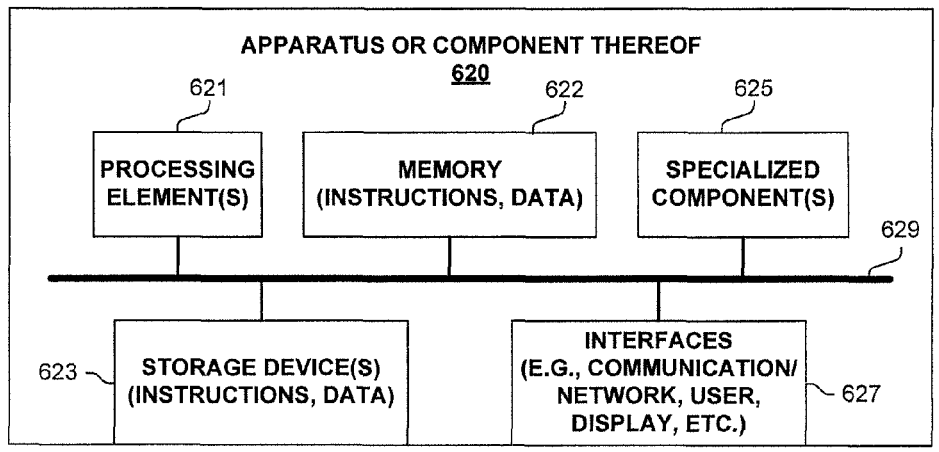
FIG. 6B illustrates an apparatus according to one embodiment.

FIG. 6B is a block diagram of an apparatus 620 used in one embodiment using rule-based virtual address translation for accessing data. In one embodiment, apparatus 620 performs one or more processes, or portions thereof, corresponding to one of the flow diagrams illustrated or otherwise described herein, and/or illustrated in another diagram or otherwise described herein.

In one embodiment, apparatus 620 includes one or more processing element(s) 621, memory 622, storage device(s) 623, specialized component(s) 625 (e.g. optimized hardware such as for performing conversion, data access, lookup and/or packet processing operations, etc.), and interface(s) 627 for communicating information (e.g., sending and receiving packets, user-interfaces, displaying information, etc.), which are typically communicatively coupled via one or more communications mechanisms 629, with the communications paths typically tailored to meet the needs of a particular application.

Various embodiments of apparatus 620 may include more or fewer elements. The operation of apparatus 620 is typically controlled by processing element(s) 621 using memory 622 and storage device(s) 623 to perform one or more tasks or processes. Memory 622 is one type of computer-readable/computer-storage medium, and typically comprises random access memory (RAM), read only memory (ROM), flash memory, integrated circuits, and/or other memory components. Memory 622 typically stores computer-executable instructions to be executed by processing element(s) 621 and/or data which is manipulated by processing element(s) 621 for implementing functionality in accordance with an embodiment. Storage device(s) 623 are another type of computer-readable medium, and typically comprise solid state storage media, disk drives, diskettes, networked services, tape drives, and other storage devices. Storage device(s) 623 typically store computer-executable instructions to be executed by processing element(s) 621 and/or data which is manipulated by processing element(s) 621 for implementing functionality in accordance with an embodiment.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
matching a virtual address simultaneously in parallel against a set of a plurality of predetermined rules in identifying one or more storing description parameters for converting the virtual address to a lookup address, with each of the plurality of predetermined rules including a range of one or more virtual addresses stored in a binary or ternary content-addressable memory entries, with said matching operation including performing a single hardware-based content-addressable memory lookup operation simultaneously and in parallel on each of said content-addressable memory entries resulting in a single matching rule, and retrieving said storing description parameters from a location in a storing description parameter storage corresponding to the single matching rule;
converting the virtual address to the lookup address based on said identified storing description parameters; and
performing one or more data access operations in one or more particular memory units based on the lookup address said converted from the virtual address.

2. The method of claim 1, wherein the lookup address includes one or more physical addresses in said one or more particular memory units.

3. The method of claim 1, wherein a plurality of memory units includes said one or more particular memory units; wherein said identified storing description parameters include an identification of said one or more particular memory units; and wherein the method includes:
matching a second virtual address simultaneously in parallel against the set of the plurality of predetermined rules to identify one or more second storing description parameters for converting the second virtual address to a second lookup address, wherein said identified second storing description parameters include an identification of a second one or more particular memory units, different than said one or more particular memory units, of the plurality of the memory units;
converting the second virtual address to the second lookup address based on said identified second storing description parameters; and
performing one or more data access operations in said second one or more particular memory units based on the second lookup address said converted from the second virtual address.

4. The method of claim 3, wherein said matching and converting operations are performed within a device; wherein the device includes said one or more particular memory units; and wherein said one or more second particular memory units are external to the device.

5. The method of claim 3, wherein the first and second virtual addresses correspond to different entries in a same tabular data structure.

6. The method of claim 1, comprising:
matching a second virtual address simultaneously in parallel against the set of the plurality of predetermined rules to identify one or more second storing description parameters for converting the second virtual address to a second lookup address, wherein said identified second storing description parameters include an identification of said one or more particular memory units, wherein said identified second storing description parameters are different than said identified first storing description parameters;
converting the second virtual address to the second lookup address based on said identified second storing description parameters; and
performing one or more data access operations in said one or more particular memory units based on the second lookup address said converted from the second virtual address.

7. The method of claim 1, wherein the set of the plurality of the predetermined rules contains at least two rules that have overlapping space that match the virtual address; and wherein said matching the virtual address against the set of the plurality of predetermined rules includes deterministically selecting a particular rule among said at least two rules that match the virtual address as the single matching rule.

8. The method of claim 7, wherein said one or more storing description parameters associated with a first rule of said at least two rules and said one or more storing description parameters associated with a second rule of said at least two rules identify to store in different memory units of said particular one or more memory units.

9. The method of claim 7, wherein said one or more storing description parameters associated with a first rule of said at least two rules identify striping of data, and said one or more storing description parameters associated with a second rule of said at least two rules identify no striping of data.

10. The method of claim 1, wherein said one or more storing description parameters includes at least one storing description parameter from a set of storing description parameters consisting of: power-of-two translation page size, power-of-two virtual page offset, non-power-of-two-aligned physical offset, translation stride, and a packed table indicator.

11. The method of claim 1, including: determining the virtual address from a table offset and base address prior to said matching operation.

12. The method of claim 1, wherein said one or more data access operations consists of one or more read operations.

13. An apparatus, comprising:
content-addressable memory and storing description parameter storage hardware configured to perform a single hardware-based content-addressable memory lookup operation based on an input virtual address simultaneously and in parallel on each of a plurality of stored content-addressable memory entries and a storing description parameter memory lookup operation resulting in the identification of a single matching content-addressable memory entry of the plurality of stored content-addressable memory entries which is used to retrieve one or more storing description parameters for converting the virtual address to a lookup address;
address translation hardware configured to convert the virtual address to the lookup address based on said identified storing description parameters; and
one or more memories configured to perform one or more data access operations based on an address identified by the lookup address.

14. The apparatus of claim 13, wherein said one or more memories includes one or more external memories and one or more internal memories;
wherein the apparatus includes an application-specific integrated circuit (ASIC), and said one or more external memories external to the ASIC;
wherein the ASIC includes said content-addressable memory and storing description parameter storage hardware, said address translation hardware, and said one or more internal memories;
wherein the apparatus is configured to determine the lookup address for accessing data in said one or more internal memories for the input virtual address having a first value; and
wherein the apparatus is configured to determine the lookup address for accessing data in said one or more external memories for the input virtual address having a second value.

15. The apparatus of claim 14, wherein said stored content-addressable memory entries include two content-addressable memory entries that partition a same table data structure or a same list data structure among at least one of said one or more external memories and at least one of said one or more internal memories.

16. The apparatus of claim 15, wherein said two content-addressable memory entries that partition a same table data structure or a same list data structure among at least one of said one or more external memories and at least one of said one or more internal memories are determined at run-time.

17. The apparatus of claim 13, wherein said content-addressable memory and storing description parameter storage hardware is configured to receive a rule set selection value for selecting among a plurality of sets of stored content-addressable memory entries, wherein a single set of the plurality of sets of stored content-addressable memory entries corresponds to the plurality of stored content-addressable memory entries.

18. The apparatus of claim 17, wherein said one or more memories includes one or more external memories and one or more internal memories;
wherein the apparatus includes: an application-specific integrated circuit (ASIC), and said one or more external memories external to the ASIC;
wherein the ASIC includes said content-addressable memory and storing description parameter storage hardware, said address translation hardware, and said one or more internal memories;
wherein the apparatus is configured to determine the lookup address within said one or more internal memories for the input virtual address having a particular value when the rule set selection value is a first value; and
wherein the apparatus is configured to determine the lookup address within said one or more external memories for the input virtual address having the particular value when the rule set selection value is a second value.

19. The apparatus of claim 13, wherein each of the content-addressable memory lookup hardware and storing description parameter memory includes a second interface for respectively being updated.

20. An apparatus, comprising:
external memory; and
an application-specific integrated circuit, including:
  internal memory;
  content-addressable memory and storing description parameter storage hardware configured to perform a single hardware-based content-addressable memory lookup operation based on an input virtual address simultaneously and in parallel on each of a plurality of content-addressable memory entries of a selected set of a plurality of sets of stored content-addressable memory entries and a storing description parameter memory lookup operation in said content-addressable memory and storing description parameter storage hardware resulting in the identification of a single matching content-addressable memory entry of the plurality of stored content-addressable memory entries which is used to retrieve one or more storing description parameters for converting the virtual address to a lookup address; and
  address translation hardware configured to convert, based on said identified storing description parameters, the virtual address to the lookup address for performing a data access operation in either the internal or external memory as defined by said identified storing description parameters at a location identified by the lookup address.

\* \* \* \* \*